Figure 1:
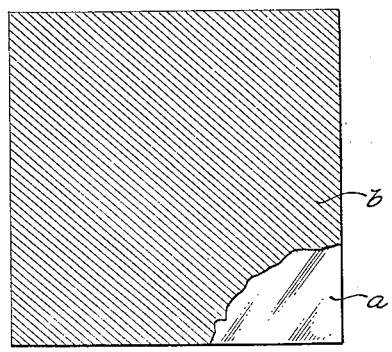

April 12, 1927.

J. A. MOROSS 1,623,967

PROCESS OF PRODUCING IMITATION MARBLE

Filed Oct. 25, 1926

Inventor
Joseph A. Moross,

By

Attorneys

Patented Apr. 12, 1927.

1,623,967

UNITED STATES PATENT OFFICE.

JOSEPH A. MOROSS, OF DETROIT, MICHIGAN.

PROCESS OF PRODUCING IMITATION MARBLE.

Application filed October 25, 1926. Serial No. 144,041.

This invention relates to imitation marble, and has for its object to provide a very simple, cheap and effective process whereby the delineation of the characteristics of coloring, blending and appearance may be effected on glass, celluloid or other suitable transparent support, in a manner admitting of all the rich and beautiful effects such as are found in natural marble to be copied or simulated either with substantial truth or with such suitable modification as may recommend itself according to the use to which the resulting product is to be put.

The process consists in painting the back of a glass or other suitable transparent support with a water color paint of a heavy water-diluted nature and with or without size therein which is stippled while wet to produce a tight, even coat, and veining this coat with alcohol applied by means of a brush or other suitable article in a more or less irregular manner characteristic of the veining of real marble, whereby equilibrium of surface tension in the coat of water color is disturbed throughout its area in a manner producing an activity in the said coat of water color and resulting in the opening up of transparent or more or less transparent seams and veins in the said water color coat and variation of the density of the pigment in different parts of the coat.

The alcohol being much more volatile than the water of the water-color will evaporate while the water color is still wet, except such of the alcohol as becomes dissolved in the water about the margins of the veins. After such evaporation has taken place and before the water-color has dried, a further color is inserted by means of a suitable brush or other means in the veins opened up in the water color, this color spreading to and marginally blending with the water-color in a somewhat irregular manner and generally in varying density and to varying extent, and while the colors are still wet the support is tilted in different directions to cause them to flow irregularly on the support so that the blending is varied and the veins distorted in a manner rendering the arrangement of the colors streaked, irregular, clouded and/or blended after the fashion of the veining and mottling of marble.

I have found white lead grounded in water and used as a pure white or suitable color to be excellent for the use as the second or vein color, While the colors are still wet, still further colors or shades may be applied locally to produce desired effects such as contrasts or darkened areas such as are characteristic of certain species of marble, and such local application of color may be made to either the veins or other portions of the coating according to requirements, and may or may not thereafter be subjected to a flowing action by the inclining of the support.

The third application of color referred to, or any subsequent application of color in a similar manner may however be made after the first two colors have been permitted to dry, and very pleasing results may be obtained in that manner, especially in view of the fact that with suitable pigments, areas more or less transparent may result due to variations in density of the coat, and localized application of color to such area will control the color of the coating when viewed through the support. For this reason, it is preferred that this localized application of color be made while the coating is viewed through the support so that the disposition and extent and density of the application may be suitably taken care of.

After all of the colors have been applied as required and dried, a suitable backing of paint or other material for protective purposes may be laid over the whole coating.

For the purpose of illustration, attention is directed to the accompanying drawing, wherein—

Figures 1 to 5 illustrate the five states hereinbefore set forth of the process.

Figure 2:
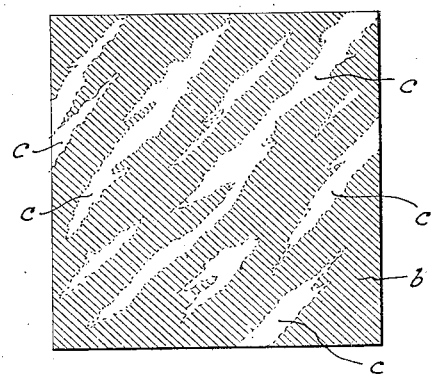

More particularly, Figure 1 illustrates a sheet of glass $a$ to which a coating $b$ of water color paint has been applied as previously described, and Figure 2 illustrates a coating broken into transparent streaks $c$ by the application thereto of alcohol or a similar surface tension reducing agent, the application being made in the general direction in the form more or less of the principal markings required in imitation marble, although this may not necessarily be the case as the subsequent flowing operation may be carried to such an extent as to vary the streaks or markings to a very great degree from the original form resulting from the application of the alcohol.

Figure 3:
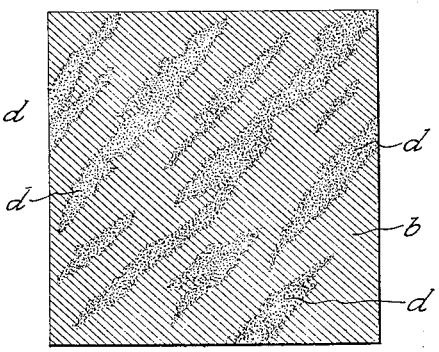
Figure 5:
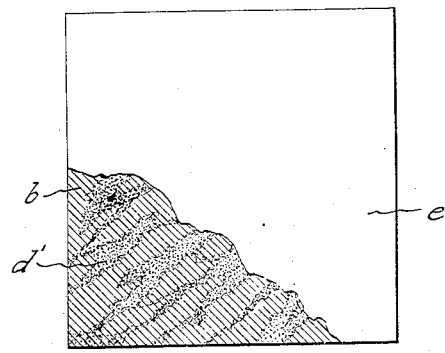
Figure 4:
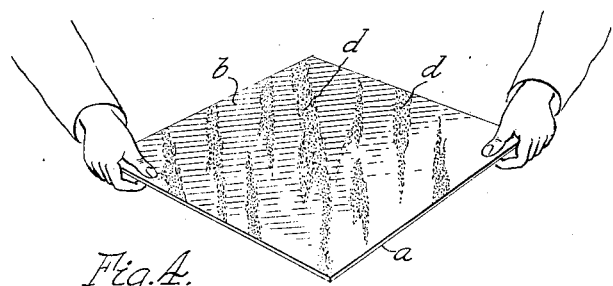

In Figure 3 the transparent streaks are indicated as having a further color $d$ different to that of $b$ or the ground color applied to the transparent streaks after the alcohol has evaporated therefrom and while the ground color *b* is still wet; and as indicated in Figure 4 the glass support is tilted in any desired directions to cause a flowing of both colors until a blending and the regular arrangement of the colors closely resembling the form and appearance of marble is obtained, after which if no further colors are to be applied while the colors are wet as has previously been indicated may sometimes be desirable, the colors are dried, and as shown in Figure 5 a protective backing *e* such as of a silicate or other paint is laid over the colors already applied. The difference in the form of the color arrangement as a result of the flowing operation of Figure 4 is quite apparent from a comparison of the streaks *d'* of Figure 5 with the streaks *d* of Figure 3, and it will be readily appreciated that this method of flowing will produce a natural blending and arrangement of the colors which would be very difficult to obtain by any deliberate painting or drawing process on the glass or support such as has been the general method of imitating marble on such transparent supports. After applying the tension reducing medium to the first coat of water-color and creating the transparent veins therein, it is necessary sometimes, to let it dry thoroughly before applying the second application of color or veining material, in order to secure certain desired effects which would not be otherwise secured if the veining material or colored matter were applied into the opened veins, while the first coat was still wet. After allowing this second application to dry and before applying the final backing color or paint thereto, very pleasing results may be obtained by the introduction of suitable color pigments to areas more or less transparent, until the desired effects are secured.

Herein and in the claims the term "back" of the glass or support is intended to indicate the side opposite to that from which the imitation marble is viewed when in use although in the actual process the glass or support being horizontal or tilted, the surface referred to is in actuality the upper surface, which is merely a matter of the difference between the view points during production and in use. Also, the word "alcohol" as used is intended to refer to any medium having the properties of alcohol whereby the surface tension of the ground coating is affected in a manner resulting in the separation of the color and the formation of streaks or seams in the manner described.

What I claim is:—

1. In a process of producing imitation marble, applying to the back of a sheet of transparent material a coating of water color, streaking said water color with a surface tension reducing medium whereby transparent veins are opened up in the color, filling the said transparent veins with a further color adapted with the first color to produce a marbled effect, and subsequently applying a suitable protective coating over the said colors.

2. In a process of producing imitation marble, applying to the back of a sheet of transparent material a coating of water color, irregularly streaking said water color with a surface tension medium whereby long irregular transparent veins are opened up in the color, filling the said transparent veins with a different color marginally and irregularly blending with the first color and subsequently applying a suitable protective coating over said colors.

3. A process of producing imitation marble according to claim 2, applying the said second color to the transparent veins while the first color is still wet, and tilting the support in various desired directions to effect a flowing of the colors for the purposes specified.

In testimony whereof I affix my signature.

JOSEPH A. MOROSS.